United States Patent [19]

Chambaere

[11] Patent Number: 4,841,119
[45] Date of Patent: Jun. 20, 1989

[54] WELDING WIRE
[75] Inventor: Daniël Chambaere, Wevelgem, Belgium
[73] Assignee: N.V. Bekaert S.A., Zwevegem, Belgium
[21] Appl. No.: 124,571
[22] Filed: Nov. 24, 1987
[30] Foreign Application Priority Data Dec. 19, 1986 [BE] Belgium ............... 1/011594

[51] Int. Cl.⁴ ............................................. B23K 35/22
[52] U.S. Cl. .......................... 219/146.1; 219/145.23; 219/83; 140/715
[58] Field of Search ............. 219/146.1, 145.1, 145.22, 219/145.22, 145.23, 145.31, 145.41, 146.23, 146.24, 146.52, 85 M, 83; 140/71.5

[56] References Cited
U.S. PATENT DOCUMENTS 3,900,593  8/1975  Herczog et al. ............... 219/121 L

FOREIGN PATENT DOCUMENTS 1460984  1/1977  United Kingdom .

Primary Examiner—E. A. Goldberg
Assistant Examiner—Lincoln Donovan
Attorney, Agent, or Firm—Nixon & Vanderhye

[57] ABSTRACT

The invention relates to a welding electrode with smooth surface for gas shielded arc welding, comprising a steel substrate provided with a thin, ferrous oxide containing covering layer. This covering layer has a thickness of less than 500 Å and the structure of a ferric oxide gel comprising trivalent Fe-cations surrounded by oxygen containing anions, which anion-surrounded cations are amorphously bound in an aqueous gel-like network.

A method is also described of producing this electrode and of using it in an arc-welding process.

12 Claims, No Drawings

WELDING WIRE

The invention relates to a welding wire, more particularly to a steel wire electrode for application in automatic or semi-automatic gas shielded arc welding. The invention relates further to a method of producing this welding electrode.

It is known from British Pat. No. 1,460,964 of the present applicant to provide steel wire welding electrodes which have a smooth surface with a relatively thin, uniform and compact iron oxide layer comprising at least 80 % of $Fe_3O_4$. This compact oxide layer protects the welding wire from further atmospheric oxidation and can have a thickness of less than 1 μm, e.g. of 0.8–0.9 μm, giving the oxidized electrode a bluish appearance. According to this patent, a thin oxide layer is very desirable with a view to maintaining good deformability (flexibility) for winding and unwinding the welding wire thereby preventing crack formation in the oxide layer. Cracks in the hard oxide layer may on occasion scale off resulting in the formation of iregularities and unevennesses in the electrode surface, which may hinder an even feeding of the welding electrode to the welding point. The contents of this British Patent are herewith included in this application by way of reference.

It has now been found that an oxide layer that is markedly thinner than stated in this British Patent, namely with a thickness smaller than 500 Å, can also adequately protect the electrode surface from further atmospheric oxidation (rust formation) provided the covering layer is richer in oxygen than the $Fe_3O_4$ containing protective layer in accordance with the British Patent. This oxygen richer oxide layer can probably even result in a higher deposition capacity for the welding electrode. More particularly, the structure of this oxygen richer covering layer in accordance with the invention is, or is very analogous to that of ferric oxide gel comprising trivalent Fe-cations surrounded by oxygen-containing anions, which by-anion-surrounded cations are amorphously bound in an aqueous gel-like network. Such an oxidized electrode surface has a yellowish appearance. This means that, via reflection-colour measurements with a Minolta Chromameter II, a positive a-value (red reflection) of between 0.8 and 4 can be expected combined with a positive b-value (yellow reflection) of between 8 and 15. The richer $O_2$ content in the surface results on the one hand from the fact that the trivalent oxidation state of the iron cation represents a richer oxygen content than is present in $Fe_3O_4$ and on the other hand from the fact that the said aqueous network produces an extra increase in the oxygen content of the covering layer.

The higher oxygen content of the electrode's surface layer probably causes the fusing temperature to be reached more rapidly during arc welding, in other words, a higher rate of deposition is obtained with the same electric power or the same rate of deposition as before is already reached with a lower electric power.

During welding, the oxygen-containing surface layer at the fusing end of the electrode will in situ dehydrate at least partly and quite rapidly to form $\gamma$-$Fe_2O_3$ and will probably create there a zone of protective gas enriched with oxygen (possibly partly in plasma state).

The composition of the oxide layer can be determined via $^{57}Fe$ Mössbauer spectroscopy. This is a technique to examine ferrous materials by irradiating them with energy modulated $\gamma$-radiation and by registering the intensity of the different $\gamma$-energies after passage through the material (the Mössbauer spectrum). The chemical and physical environment of the iron atoms in the material shifts the position of the nuclear energy levels so that resonant absorption of passing $\gamma$-quanta through the core only occurs with $\gamma$-energies that are characteristic of this particular environment. These interactions between the Fe-core and its environment (especially anion co-ordination and magnetic state) are called hyperfine interactions. It is the measurement of these hyperfine-parameters from the Mössbauer spectrum (isomer shift, electric quadrupole splitting and magnetic dipole splitting) which establishes not only the particular oxide, hydroxide or oxyhydroxide (FeO, $Fe_2O_3$, $Fe_3O_4$, FeOOH, etc.), but also establishes the particular structural modification of such oxide, hydroxide, or oxyhydroxide (e.g. $\alpha$- or $\gamma$-$Fe_2O_3$; $\alpha$-, $\beta$-, or $\gamma$-FeOOH) which is involved.

An analysis of the welding wire oxide scale according to the invention with the aforesaid method allows it to be unequivocally concluded from the spectra (recorded at ambient temperature) that all iron is in a trivalent state ($Fe^{+3}$). The spectra recorded in liquid helium (4.2° K.)—i.e. in the magnetically ordered field—allow one distribution of internal hyperfine fields only to be determined, (and not two as in the ferrimagnetic magnetite $Fe_3O_4$). This allows us to conclude with certainty that we are not dealing with $Fe_3O_4$. The very long temperature range over which the magnetic ordering in the material takes place during cooling is indicative of superparamagnetism. This means that we are dealing with very small particles, in other words that the anion-surrounded cations have a diameter of less than 100Å, possibly of less than 50 Å. The hyperfine parameters at 4.2° K. do not correspond to any classic crystalline oxide, hydroxide or oxyhydroxide (not to $\alpha$- and $\gamma$-$Fe_2O_3$, $Fe_3O_4$, $Fe(OH)_3$, $\alpha$-, $\beta$-, $\gamma$- and $\delta$-FeOOH).

On the basis of its very specific magnetic behaviour at 4.2° K. outside and inside an external magnetic field of 6T, we can conclude that the oxidic material moreover orders itself speromagnetically. Speromagnetism is a complex magnetically ordered spin structure characteristic of a so-called "ferric gel".

An oxide scale that is isomorphous with a "ferric gel" implies that we are dealing with amorphous or cryptocrystalline particles (i.e. as to structure intermediary between amorphous strictu sensu and really crystalline), which are very small (diameter less than 50 to 100 Å). These particles are loosely bound in a network, with water between the particles (a gel). According to the analysis, the $Fe^{3+}$cation is situated in an octahedral anion environment, the six corners of the co-ordination octahedron possibly being $O^{2-}$, $OH^-$ or $H_2O$. These octahedra are connected in an unstructured way (no long-range ordering) via common corners (corner sharing). Consequently, the gross formula of the iron oxide formed may be : $Fe(OH)_3.nH_2O$ or $FeOOH.(n+1)H_2O$ or $Fe_2O_3.(2n+3)H_2O$ or mixtures thereof (i.e. mixtures of crystallites and/or mixtures of octahedra).

Naturally, the welding electrode will preferably have a smooth and clean surface as stated and specified in the said British patent. To this end, the welding wire can for instance be drawn applying very good wire lubrication during wire drawing.

Obviously, the steel substrate must have an alloy composition that is suitable for gas shielded welding. A typical composition comprises for instance 0.05 to 0.19% by weight of C; 0.3 to 1.1% by weight of Si and 0.9 to 1.95% by weight of Mn.

So, if the welding electrode is a round wire it will be carefully drawn to the desired final diameter in order to obtain a regular surface. Preferably, the irregularities in the wire surface or the roughness does not exceed 0.5 $\mu$m on average and may even drop to an average of below 0.2 $\mu$m, also after the oxidation treatment. After drawings, the wire surface is thoroughly cleaned to remove residual soap and/or other contaminants, with steam for instance so that a more or less bright surface is obtained. If desired, finishing drawing and cleaning can be carried out at high speed: e.g. up to 1200 m/min.

The oxidation treatment preferably consists of a continuous annealing treatment in air to guarantee good uniformity in the formed oxide covering layer. To that end, the wire is e.g. passed in a zigzag or loop path over a set of rollers between which an electric potential difference is applied so that an electric current is generated with the effect of resistance heating in the consecutive wire segments passing through. The annealing treatment desired for the wire is obtained by regulating wire speed, roller distances and voltage. Preferably the wire is subsequently passed through a pre-annealing and a final annealing section. The surrounding atmospheric oxygen then effects the formation of the desired oxide. Processing parameters can be established through experimental tests as a function of i.a. the wire diameter.

EXAMPLE

An electrode wire with composition: 0.08% C, 0.94% Si and 1.77% Mn and with a diameter of 0.88 mm is cleaned with steam after drawing and is passed through a continuous annealing installation with a pre-annealing section and a subsequent final-annealing section at a speed of 500 m/min. The potential difference (direct current) between the feeding roller of the final-annealing section (which is connected to an electrical potential (voltage) source) and the earthed feeding roller of the pre-annealing section amounts to some 110 Volt. (The feeding roller of the final-annealing section is at the same time delivering roller of the pre-annealing section). The same potential difference is present between the feeding roller of the final-annealng section and the earthed and water-cooled delivering roller of this section. However, the distance covered in the final-annealing section is almost one meter shorter than in the pre-annealing section (where the distance covered measures 5.7 m). The current in the final-annealing section amounts to some 60 A and the wire temperature right before contact with the water-cooled delivering roller probably amounts to some 250° to 300° C.

The potential differences in the two annealing sections are chosen with respect to the annealing distances covered, in such a way that the formation of sparks is precluded in the zones where the wire reaches the various rollers or leaves them (i.e. in the zones where contact is made, respectively interrupted between wire and roller). As is well known, sparks cause the formation of local irregularities (fusion craters) in the wire surface, which has to be avoided at all costs. Besides, the oxidation state in these uneven zones mostly differs from the one over the rest of the welding wire, which of course is not favourable, either.

When analyzing the oxide scale (covering layer) on the thus annealed electrode wire with the $^{57}$Fe Mössbauer spectroscopy we establish the formation of a ferric oxide gel comprising trivalent Fe cations as described hereinbefore and with an octahedral environment of oxygen-containing anions which octahedra are amorphously bound in an aqueous gel-like network.

When carrying out colour measurements (reflection measurements) with a Minolta Chromameter II on the oxidized electrode wire we observe an a-value with an average of +3.3 (red reflection) and a b-value with an average of +12.3 (yellow reflection).

When using this oxidized electrode wire for automatic arc welding (MIG) in a protective atmosphere of $CO_2$ we establish a more regular welding seam and less spatters with a welding current of less than 300–320 Å than for an analogous electrode wire with copper covering layer. The welding arc is more regular and narrower and the deposition capacity is some 10% higher than for a copper-plated electrode wire when applying a welding current of more than 300 Å. The oxidized electrode wire also gives a somewhat better tolerance on the postulated arc voltage values.

As, however, the oxide layer at the surface of the electrode wire is harder than a copper layer, the frictional resistance between wire and guiding and current-transmission elements in the welding head will mostly be higher for oxidized than for copper-plated welding wire. Consequently, these elements will preferably have good wear resistance to guarantee a constant and improved current transfer resistance (better contact) and resulting in excellent welding behaviour.

I claim:

1. Welding electrode for arc welding, comprising a steel substrate having a thin, ferrous oxide containing covering layer, wherein said covering layer has a thickness of less than 500 Å and has the structure of a ferric-oxide gel comprising trivalent Fe-cations that are surrounded by oxygen-containing anions, which anion-surrounded cations are amorphously bound in an aqueous gel-like network.

2. Welding electrode according to claim 1 wherein said Fe-cations are octahedrally surrounded by the anions.

3. Welding electrode according to claim 2, wherein the diameter of the octahedrally surrounded cations is smaller than 100 Å.

4. Welding electrode according to claim 3, wherein the diameter of the octahedrally surrounded cations is smaller than 50 Å.

5. Welding electrode according to claim 1, having a smooth surface with an average roughness not exceeding 0.5 $\mu$m.

6. Welding electrode according to claim 1, wherein the steel substrate comprises 0.05 to 0.19% by weight of C, 0.3 to 1.1 % by weight of Si and 0.9 to 1.95% by weight of Mn.

7. Method for automatic or semi-automatic gas shielded arc welding, which method comprises using a welding electrode comprised of a steel substrate having a thin, ferrous oxide containing covering layer, wherein said covering layer has a thickness of less than 500 Å and has the structure of a ferric-oxide gel comprising trivalent Fe-cations that are surrounded by oxygen-containing anions, which anion-surrounded cations are amorphously bound in an aqueous gel-like network.

8. Method according to claim 7, wherein during welding the welding electrode is fed through wear resistant guiding elements.

9. Method according to claim 7, which includes using a protective gas consisting at least partially of $CO_2$.

10. Method according to claim 7, wherein during welding, the ferric oxide gel is allowed to dehydrate in situ so to at least partially form $\gamma$-$Fe_2O_3$.

11. Method for producing a welding electrode comprising continuously annealing a steel electrode wire in air to form a thin, ferrous oxide containing covering layer thereon, which covering layer has a thickness of less than 500 Å and has the structure of a ferric-oxide gel comprising trivalent Fe-cations that are surrounded by oxygen-containing anions, which anion-surrounded cations are amorphously bound in an aqueous gel-like network.

12. Method according to claim 11, wherein said step of continuously annealing said steel electrode wire includes passing the wire between pre-annealing and final annealing sections along a path defined by a set of rollers, and applying an electric potential difference therebetween.

* * * * *